United States Patent [19]

Bongard

[11] Patent Number: 4,809,567
[45] Date of Patent: Mar. 7, 1989

[54] DISC BRAKE TOOL AND KIT

[76] Inventor: Peter W. Bongard, 4259 Parkview Dr., Janesville, Wis. 53545

[21] Appl. No.: 184,119

[22] Filed: Apr. 21, 1988

[51] Int. Cl.⁴ .............................................. B23P 19/04
[52] U.S. Cl. ........................................... 81/485; 29/239
[58] Field of Search .................... 81/485, 488; 29/239, 29/256, 266

[56] References Cited

U.S. PATENT DOCUMENTS

| | | | |
|---|---|---|---|
| 3,007,241 | 11/1961 | Gonzalez | 29/266 |
| 3,584,364 | 6/1971 | Steck | 81/485 |
| 3,727,490 | 4/1973 | Diffenderfer et al. | 81/485 |
| 3,835,522 | 9/1974 | Ward | 29/239 |
| 4,086,128 | 5/1978 | Mader | 81/485 |

Primary Examiner—Roscoe V. Parker
Attorney, Agent, or Firm—Lathrop & Clark

[57] ABSTRACT

A disc brake tool and kit is disclosed which is used for back seating disc brake pistons into the bores after old brake pads have been removed to make room for new brake pads. The disc brake tool includes a driven jaw with a first bearing surface and gudgeon socket, a driving jaw with second bearing surface and a centrally located threaded hole, and a threaded bolt which screws into the centrally located threaded hole and seats within the gudgeon socket to maintain the two bearing surface in parallel relation to each other. Turning the threaded bolt in one direction causes the bearing surfaces on the jaws to move away from each other thereby driving the disc brake piston back into its bore. Rotating the threaded bolt in the other direction loosens the jaws and bolts so that they can be removed from within the caliper of the disc brake. The kit further includes a U-shaped clip which may be placed over the jaws which are joined to form a compact container in which the threaded bolt is received for easy storage.

6 Claims, 2 Drawing Sheets

DISC BRAKE TOOL AND KIT

BACKGROUND OF THE INVENTION

1. Field of the Invention

The present invention relates to devices for separating pads or backseating disc brake pistons into their bores after the old brake pads have been removed to make room for new brake pads.

2. Description of the Related Art

As disc brake pads become more used with age, they tend to become worn thin so that the pistons within the caliper have to extend further out from their respective bores to compensate for the wear on the brake pads to maintain a proper clearance between the brake pads and rotor. When the old brake pads are removed, the pistons must be fully backseated into their respective bores to make more room so that the new brake pads may then be installed within the caliper with the proper clearance between the new brake pads and the rotor.

Various devices have been used for separating disc brake pads or for backseating disc brake pistons into the bores to make room for new brake pads. The U.S. Pat. No. 3,835,522 to Ward discloses a disc brake spreader which includes a pair of thin-plate jaws which are shaped essentially like disc brake pads, with one jaw fixed to a guide rod and the other jaw slideably mounted on the guide rod. The guide rod maintains the jaws in a parallel relation to one another when they are moved with respect to each other. The jaws of the Ward disc brake spreader each include an upwardly projecting portion through which the jaws are connected by an expansion screw threaded through the immoveable jaw which is fixed to the guide rod. The expansion screw extends parallel to the axis of the guide rod and has an end which is journaled in the slideable jaw and secured thereto by a retainer which permits the jaws to move inwardly or outwardly by turning the screw.

Other devices translate rotational motion applied to a handle of the device into motion which spreads the pistons or brake pads by means of X-shaped linkages driven apart by a drive screw connected to the handle. Another device for separating brake pads in a disc brake caliper is a one piece rod bent at is opposite ends to form spacers, each spacer having the general shape of a hook. The central portion of the rod forms a handle, and the hook design allows the spacers to be wedged between the brake pads of the caliper to hold the brake pads in separated parallel relationship.

It is desirable that there be a brake shoe piston backseating device which is simple, inexpensive, yet storable in a compact and safe manner without the aid of a separate container.

SUMMARY OF THE INVENTION

The present invention is summarized in that a disc brake tool kit for back seating disc brake pistons into their bores after old brake pads have been removed to make room for new brake pads includes a driven jaw with an outer side of which a lower portion is a first bearing surface which when in use is placed against a circular edge of a piston on a first side of a disc break caliper, an inner side which has a centrally located gudgeon socket with a cylindrical wall perpendicular to the first bearing surface so it is adapted to receive a cylindrical journal, and a skirt extending perpendicularly about a periphery of the inner side, the skirt having an inner edge.

The disc brake tool kit further includes a driving jaw having a an outer side of which a lower portion is a second bearing surface which is placed against a circular edge of a piston on a second side of a disc brake caliper, an inner side, a centrally located threaded hole through the jaw to receive a threaded bolt, and a skirt extending perpendicularly about a periphery of the inner side, the skirt including an inner edge which mates with the inner edge of the driven jaw skirt so that the two jaws join together to form a container when the tool kit is unused. Additionally, the disc brake tool kit includes a threaded bolt which maintains the bearing surfaces in parallel relation and by being rotated adjusts the distance therebetween. The threaded bolt includes a head, a threaded central shaft adapted to be screwed into the threaded hole in the driving jaw, and a cylindrical journal at the end of the bolt opposite the head Finally, the disc brake tool kit also includes a U-shaped clip having two prongs which hold the two jaws together with their inner edges mating so the two jaws form an enclosure in which the threaded bolt is contained when the kit is unused.

The present invention is inexpensive to manufacture, simple to use, and easy to store. The bolt alone with its cylindrical journal is able to maintain the two bearing surfaces in parallel relationship with each other when the tool is in use. No additional component is necessary for connecting, guiding or stabilizing the two jaws.

The primary object of the present invention is to provide a disc brake tool and kit for backseating disc brake pistons into their bores after old brake pads have been removed, to make room for new brake pads.

A second object of the invention is to provide a disc brake tool and kit which is simple, inexpensive, easy to manufacture and to use.

Another object of the invention is to provide a disc brake tool and kit in which only a bolt with a journalled end is necessary for maintaining the bearing surfaces of the jaws in parallel relation when the tool is in use.

An additional object of the invention is to provide a disc brake tool and kit in which the jaws themselves may be placed together to form a compact and easily storable container for the threaded bolt which kit includes a clip for holding the jaws together.

Other objects, features and advantages of the invention will be apparent from the following detailed description taken in conjunction with the accompanying drawings wherein a preferred embodiment of the invention has been selected for exemplification

DESCRIPTION OF THE PREFERRED EMBODIMENT

Figure 1:
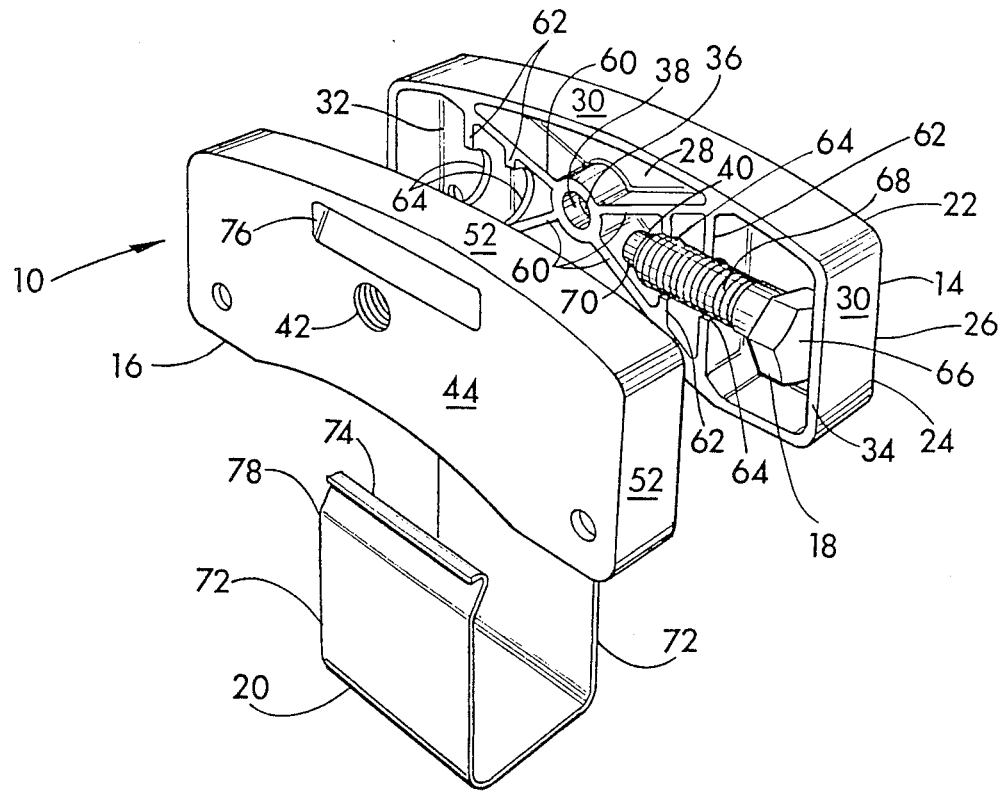
FIG. 1 is an exploded perspective view of the disc brake tool kit with the threaded bolt placed in position for storage within the jaws.
Figure 2:
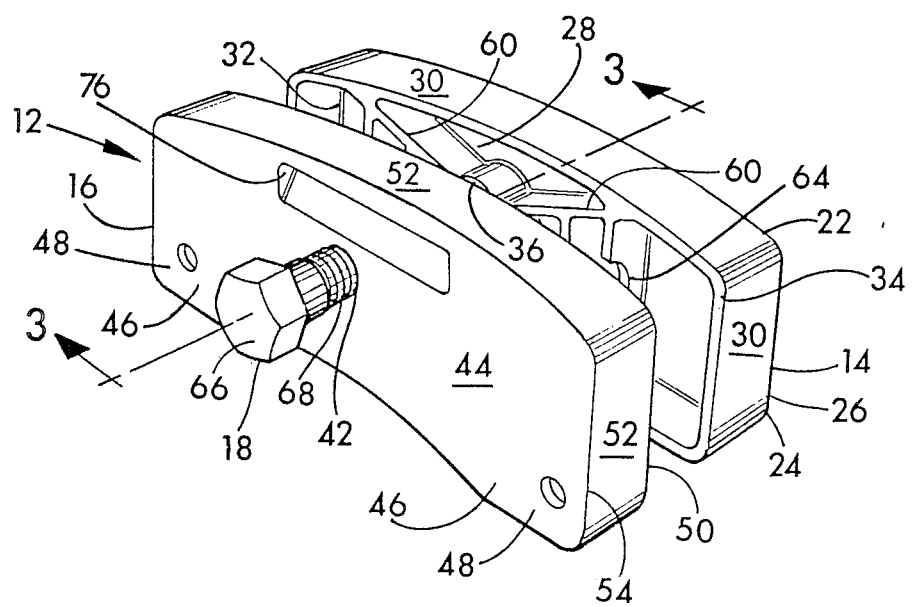
FIG. 2 is a perspective view of the disc brake tool, in its operable configuration for backseating pistons within a disc brake caliper.
Figure 3:
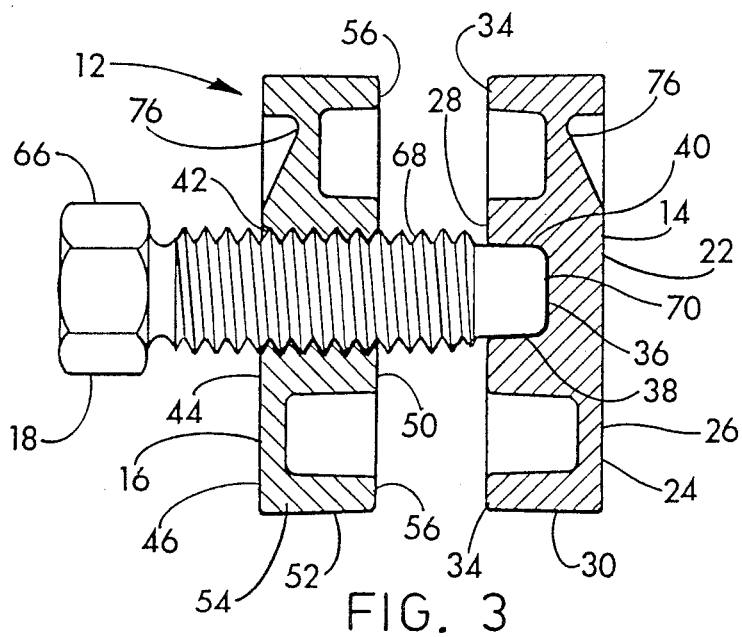
FIG. 3 is a section view taken along section line 3—3 of FIG. 2.
Figure 4:
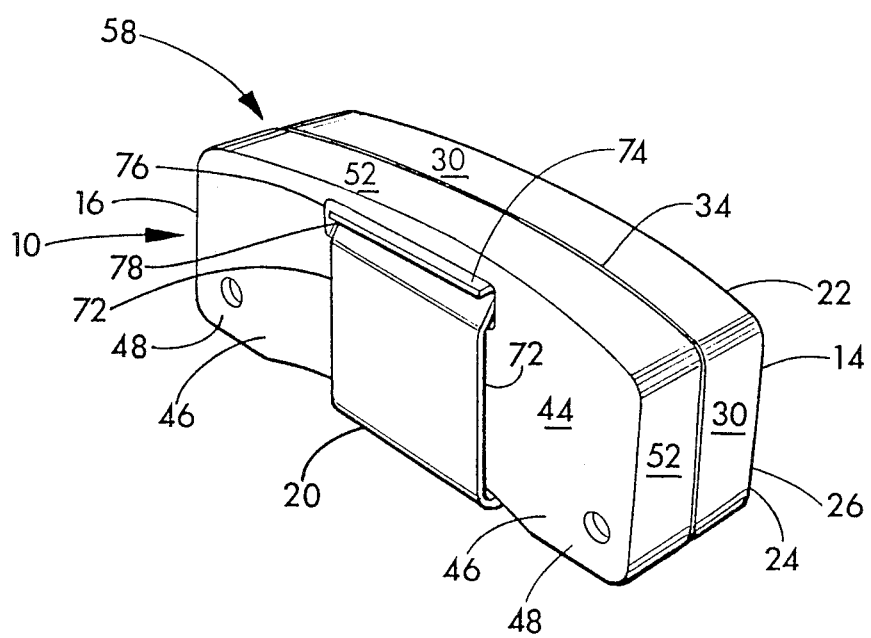
FIG. 4 is a perspective view of the disc brake tool kit with the two jaws closed together over the threaded bolt, and with the clip holding the two jaws together as a container.

Referring more particularly to the drawings, wherein like numbers refer to like parts, FIG. 1 shows disc brake tool kit 10 of the present invention in an exploded perspective view. FIG. 2 shows the disc brake tool 12, with its components in operable position. The four main components of the disk brake tool kit 10 include a driven jaw 14, a driving jaw 16, a threaded bolt 18, and a resilient U-shaped clip 20. As is shown in FIG. 2, the main components of the disc brake tool 12 are the driven jaw 14, the driving jaw 16, and the threaded bolt 18. FIG. 3 shows a section view of the disc brake tool 12 with its components in operative position. FIG. 4 shows that the U-shaped clip 20, driven jaw 14, and driving jaw 16 may be used to form a storage container including the threaded bolt 18 stored securely therein.

Referring to FIGS. 1 and 3, the driven jaw 14 has an exterior side 22 of which a lower portion 24 is a first exterior bearing surface 26 which when in use is placed against a circular edge of a piston (not shown) on a first side of disc brake caliper (not shown). Currently, most disc brake calipers actually have two pistons on each side of the caliper. Therefore the exterior bearing surface 26 of the driven jaw 14 is actually designed to be placed against the circular edges of two pistons within a second side of the disc brake caliper (not shown). The driven jaw 14 also has an interior side 28, and a skirt 30 which extends perpendicularly from about a periphery 32 of the interior side 28 of the driven jaw 14. The skirt 30 includes an inner edge 34 as is best shown in FIG. 1. The interior side 28 of the driven jaw 14 has a centrally located gudgeon socket 36 with a cylindrical wall 38 which is perpendicular to the first bearing surface 26 as shown in FIGS. 1 and 3. The cylindrical wall 38 within the gudgeon socket 36 is adapted to receive a cylindrical journal 40.

The driving jaw 16 has a centrally located threaded hole 42 through which the threaded bolt 18 may be received, and an exterior side 44 of which a lower portion 46 is a second exterior bearing surface 48 which is to be placed against a circular edge (not shown) of at least one piston (not shown) on a second side of a disc brake caliper (not shown). Again, similar to the first bearing surface 26, the second bearing surface 48 is actually designed to be placed against the circular edges of two pistons on a second side of a disk brake caliper. The driving jaw further has an interior side 50 and a skirt 52 which extends perpendicularly about a periphery 54 of the interior side 50. The skirt 52 includes an inner edge 56 which mates with the inner edge 34 of the driven jaw 14 skirt 30 so that the two jaws 14, 16 join to form a container 58 when the tool kit 10 is unused. Both jaws 14, 16 have structural bracing 60 located on their interior sides 28, 50 which joins with their skirts 30, 52. The two jaws 14, 16 are essentially structurally identical except that the driven jaw 14 has the gudgeon socket 36 and the driving jaw 16 has the centrally located threaded hole 42. Both jaws 14, 16 include on their side 28, 50 at least one pair of ribs 62 having semi-circular notches 64 which when the two jaws 14, 16 are mated, mate with the pair of ribs 62 and notches 64 on the opposing jaw to form two coaxial holes 66 with a diameter approximately equal to that of the threaded bolt 18 so that the bolt 18 may be held therein when the kit 10 is unused. The preferred disc brake tool kit 10 jaws 14, 16 each have two pairs of ribs 62 with semi-circular notches 64 in each rib 62 as shown in FIG. 1. The pairs of notches 64 in the interior side of each of the jars 14 and 16 form a semi-cylindrical in each jaw, the recesses joining to form a cylindrical recess when the two interior sides abut.

The threaded bolt 18 which maintains the bearing surfaces 26, 48 in parallel relation and by being rotated adjusts the distance therebetween, includes a head 66 adapted to be gripped and rotated by a tool for holding and turning bolts such as a wrench, and a threaded central portion adapted to be screwed into the centrally located threaded hole 42 in the driving jaw 16 to maintain the second bearing surface 48 perpendicularly to a longitudinal axis of the bolt 18, and to move the bolt 18 axially through the threaded hole 42. The threaded bolt 18 further includes a cylindrical journal 40 at an end 70 of the bolt 18 opposite the head 66. The cylindrical journal 40 has the same axis as the bolt 18 and is adapted to fit into the centrally located gudgeon socket 36 on the driven jaw 14 to thereby maintain the first bearing surface 26 perpendicularly to the longitudinal axis of the bolt 18 and parallel to the second bearing surface 48 on the driving jaw 16. When the tool 12 is in use, turning the bolt 18 within the threaded hole 42 in one direction moves the bolt 18 axially through the threaded hole 42 so that the cylindrical journal 40 located in the socket 36 pushes the first bearing surface 26 away from the second bearing surface 48. This pushing action which moves the bearing surfaces 26, 48 away from each other backseats the disc brake pistons (not shown) into their respective bores. Turning the bolt 18 in an opposite direction after the pistons are backseated loosens the jaws 14, 16 and bolt 18 within the caliper so that they may be removed from the caliper after use.

The resilient U-shaped clip 20 has two prongs 72 which hold the two jaws 14, 16 together with their inner edges 34, 56 mating so that the two jaws 14, 16 form a compact storage container 58 in which the threaded bolt 18 is enclosed when the kit 10 is unused. The exterior side 22, 44 of each jaw 14, 16 has a groove 76 therein and the U-shaped clip has tongue portions 74 at the end 78 f each prong 72 which fit into the grooves 76 so that the jaws 14, 16 are releasably locked and held in their mated position between the prongs 72.

In its operation, the disc brake tool kit 10 of FIG. 1 is designed to be used for backseating disc brake pistons into their bores after old brake pads have been removed to make room for new brake pads, and also is adapted to provide its own container 58 from components of the kit itself which makes storage of the kit 10 easy. Before the disc brake tool 12 is used, the brake caliper (not shown) must first be partially removed from the front spindle and backing plate. Everything but the brake hose must be removed and laid aside before the tool 12 can be placed into position. The front or rear wheel, the caliper hold down pins or bolts, and if used, the caliper slides must be removed. The user then must remove the old brake pads from within the caliper. The caliper will then have only a brake hose attached and the pistons remaining inside the caliper. The user then should place the driven jaw 14 into the caliper as he would a brake pad, resting the first bearing surface 26 on the piston or pistons circular edges. The driving jaw 16 with the threaded bolt 18 already screwed into the centrally located threaded hole 42 should then be placed into the caliper so that the bolt head 66 is oriented toward the outside of the caliper, and the cylindrical journal 40 of the bolt 18 is placed into the gudgeon socket 36 of the driven jaw 14. The disc brake tool 12 should then be in an operable configuration as shown in FIGS. 2 and 3. By turning the bolt 18 clockwise by hand or by power tool, the bolt will separate the driving jaw 16 from the driven jaw 14 and force the piston or pistons to backseat into their bore. In this manner all the pistons within a caliper may be backseated into their respective bores. When a piston is entirely backseated into its bore, turning the bolt 18 counter-clockwise will loosen the jaws 14, 16 within the caliper and allow their removal along with the bolt 18.

After use, the threaded bolt 18 should be placed into the semi-cylindrical recess formed by one pair of the semi-circular notches 64 within either of the two jaws 14, 16 as shown in FIG. 1. The two jaws 14, 16 should then be placed together so that the inner edges 34, 56 mate and so that the corresponding ribs 62 and semi-circular notches 64 join to form cylindrical recess to receive the bolt within the two mated jaws 14, 16 which form a container 58 around the bolt 18. The U-shaped clip should then be placed over the two mated jaws 14, 16 so that the tongue portions 74 at the ends 78 of the prongs 72 are inserted into the grooves 76 on the outer sides 22, 44 of both jaws 14, 16 as shown in FIG. 4. The U-shaped clip 20 holds the two jaws 14, 16 together forming a compact storage container 58 around the bolt 18. This container 58 is compact and may be easily stored away in a small area in such a manner that none of the components of the disc brake tool kit will be lost. The disc brake tool 12 may be used again by moving the U-shaped clip 20 from the two jaws 14, 16, removing the bolt 18 from in between the jaws 14, 16, inserting the bolt 18 into the centrally located threaded hole 42, then placing the tool 12 into its operable position within the caliper according to the instructions above.

The disc brake tool kit 10 is of simple construction utilizing only the threaded bolt 18 with journal 40, gudgeon socket 36 and centrally located threaded hole 42 to maintain the bearings surfaces 26, 48 in parallel relationship to each other. Additionally, the kit 10 is capable of compact storage in a manner which prevents the loss of any of the components of the kit 10 and requires only a small volume for storage.

It is to be understood that the present invention is not limited to the particular arrangements and embodiments of parts disclosed and illustrated herein, nor to the materials specified, but embraces all such modified forms thereof as come within the scope of the following claims.

What is claimed is:

1. A disk brake tool for backseating disc brake pistons in their bores after worn brake pads have been removed to make room for new brake pads comprising:
   a first jaw having an exterior bearing surface adapted to engage a piston on one side of a brake caliper and having an interior side in which is formed a gudgeon socket;
   a second jaw having an exterior bearing surface adapted to engage a piston on one side of a brake caliper and having an interior side, the second jaw having a threaded hole extending therethrough; and
   a threaded bolt having a threaded shaft, a head at one end of the threaded shaft, and a journal at the other end of the shaft and sized so that it may be threaded through the threaded hole in the second jaw with the journal engaging the gudgeon socket of the first jaw so that rotation of the bolt changes the distance between the jaws;
   the interior side of at least one of the first and second jaws having formed therein a recess sized and shaped so as to receive the bolt therein so that the bolt can be stored in the recess when not threaded in the threaded hole so that the brake tool may be compactly stored.

2. A disk brake tool as claimed in claim 1 wherein each of the jaws has formed on its interior side a complementary semi-cylindrical recess so that a complete recess properly sized for he threaded bolt is formed when the interior sides of the jaws are placed together.

3. A disk brake tool as claimed in claim 1 further comprising a resilient clip to hold the first and second jaws together so that the jaws remain abutting when the brake tool is stored.

4. A disk brake tool as claimed in claim 3 wherein each bearing surface of each jaw has a groove formed therein and the resilient clip has tongue portions shaped to fit into the grooves to hold the jaws together when the brake tool is stored.

5. A disk brake tool as claimed in claim 4 wherein the resilient clip is a U-shaped clip having the tongue portions at the ends of the prongs of the U-shape.

6. A disk brake tool as claimed in claim 1 wherein each jaw further includes a skirt extending perpendicularly from its periphery toward its interior side, the skirts of the two jaws abutting when the brake tool is stored.

* * * * *